(12) United States Patent
Frazin et al.

(10) Patent No.: US 9,727,651 B1
(45) Date of Patent: Aug. 8, 2017

(54) DYNAMIC RESEARCH SYSTEM AND METHODS OF USE

(71) Applicant: Charlie Contacts Corp, Chicago, IL (US)

(72) Inventors: Aaron Robert Frazin, Chicago, IL (US); Christopher John Curtis, Chicago, IL (US)

(73) Assignee: Charlie Contacts Corp, Chicago, IL (US)

( * ) Notice: Subject to any disclaimer, the term of this patent is extended or adjusted under 35 U.S.C. 154(b) by 0 days.

(21) Appl. No.: 15/203,739

(22) Filed: Jul. 6, 2016

(51) Int. Cl.
 *G06F 17/30* (2006.01)
 *H04L 29/08* (2006.01)

(52) U.S. Cl.
 CPC .. *G06F 17/30864* (2013.01); *G06F 17/30554* (2013.01); *H04L 67/02* (2013.01)

(58) Field of Classification Search
 CPC ............... G06F 17/30864; G06F 17/30554
 USPC ....................................................... 707/707
 See application file for complete search history.

(56) References Cited

U.S. PATENT DOCUMENTS

| 6,785,671 B1 * | 8/2004 | Bailey | G06F 17/30864 |
| | | | 705/26.81 |
| 2002/0049705 A1 * | 4/2002 | Haviv-Segal | G06N 5/025 |
| 2008/0184138 A1 * | 7/2008 | Krzanowski | G06F 17/30873 |
| | | | 715/760 |
| 2009/0006981 A1 * | 1/2009 | Pagan | G06F 9/4443 |
| | | | 715/752 |

* cited by examiner

Primary Examiner — Joshua Bullock
(74) Attorney, Agent, or Firm — One3 IP Management, P.C.; Justin G. Sanders; Peter D. Weinstein

(57) ABSTRACT

A dynamic research system and associated methods are disclosed for assisting an at least one user with dynamically and automatically researching an at least one subject across a plurality of data sources. In at least one embodiment, upon a new instance of a browser application being opened on the user device, a navigation display is overlaid onto a user interface of the browser application. Additionally, for each of the at least one data source, upon determining that an at least one page of said data source contains data related to the at least one subject, a graphical element associated with said at least one page of said data source is generated and displayed in the navigation display. Upon the user selecting a one of the at least one graphical element in the navigation display, the browser application navigates to the at least one page of the data source associated with the selected graphical element, and the navigation display is overlaid onto the user interface of the browser application once again, thereby simulating a persistent navigation display across multiple pages, though all within a single instance of the browser application.

20 Claims, 5 Drawing Sheets

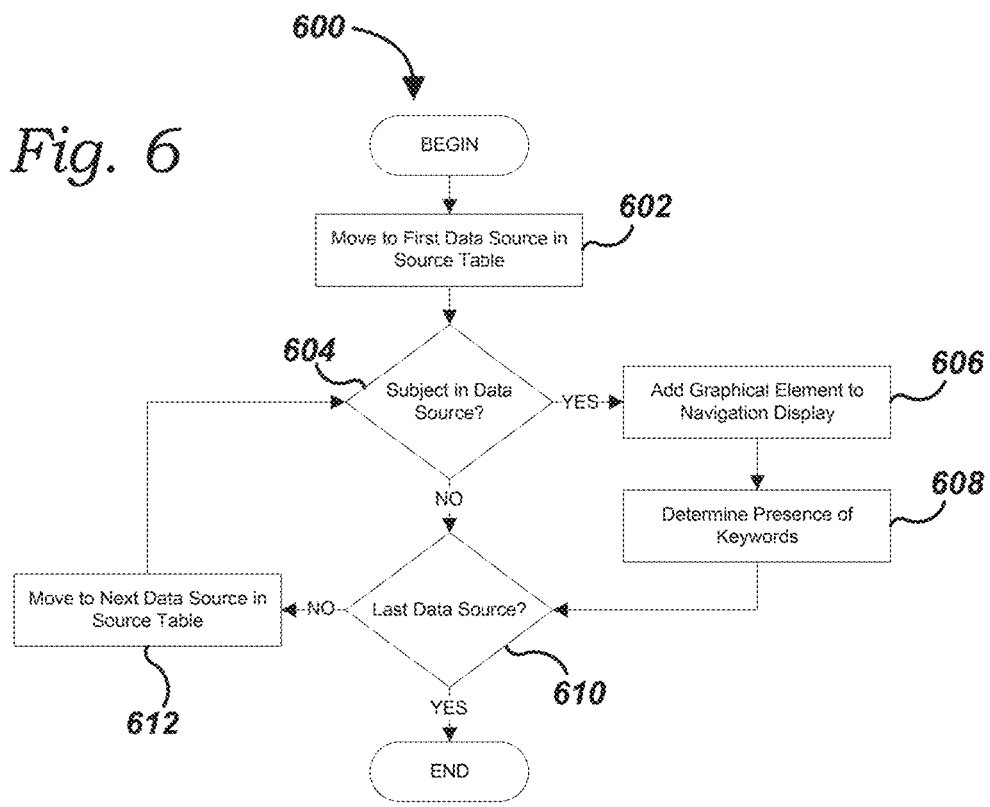

DYNAMIC RESEARCH SYSTEM AND METHODS OF USE

RELATED APPLICATIONS

Not applicable.

BACKGROUND

The subject of this patent application relates generally to research tools, and more particularly to a dynamic research system and associated methods of use for dynamically and automatically researching an at least one subject across a plurality of data sources.

Applicant(s) hereby incorporate herein by reference any and all patents and published patent applications cited or referred to in this application.

By way of background, researching a particular subject often requires manually searching a plurality of different sources, oftentimes via the Internet. Thus, users are typically required to perform separate manual searches using multiple websites and/or online databases to obtain the desired information. For individuals who are required to perform research on a regular basis, these tasks can become very time-consuming. For example, salespersons are often required to research every prospective customer or client prior to interacting with them, so as to be better prepared and increase the chances of being able to secure that customer or client. Accordingly, there remains a need for reducing the amount of time involved in performing such researching tasks.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a dynamic research system and associated methods for assisting an at least one user with dynamically and automatically researching an at least one subject across a plurality of data sources. In at least one embodiment, a user application resides in memory on an at least one user device under the control of the at least one user, the user application being configured for operating at least partially within an Internet browser application also residing in memory on the at least one user device. A user account associated with a one of the at least one user contains at least one of a source table containing details related to at least one data source to be accessed when researching the at least one subject on behalf of the associated user, and a keyword table containing particular keywords to be searched in connection with the at least one subject across the at least one data source. Upon a new instance of the browser application being opened on the user device, the user application overlays a navigation display onto a user interface of the browser application. Additionally, upon the associated user executing a new research task, the at least one subject to be researched is first obtained. For each of the at least one data source contained in the source table, upon determining that an at least one page of said data source contains data related to the at least one subject, a graphical element associated with said at least one page of said data source is generated and displayed in the navigation display. Upon the user selecting a one of the at least one graphical element in the navigation display, the user application causes the browser application to navigate to the at least one page of the data source associated with the selected graphical element, and the navigation display is overlaid onto the user interface of the browser application once again, thereby simulating a persistent navigation display across multiple pages, though all within a single instance of the browser application.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIGS. 5 and 6 are flow diagrams of an exemplary method for administering the dynamic research system, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
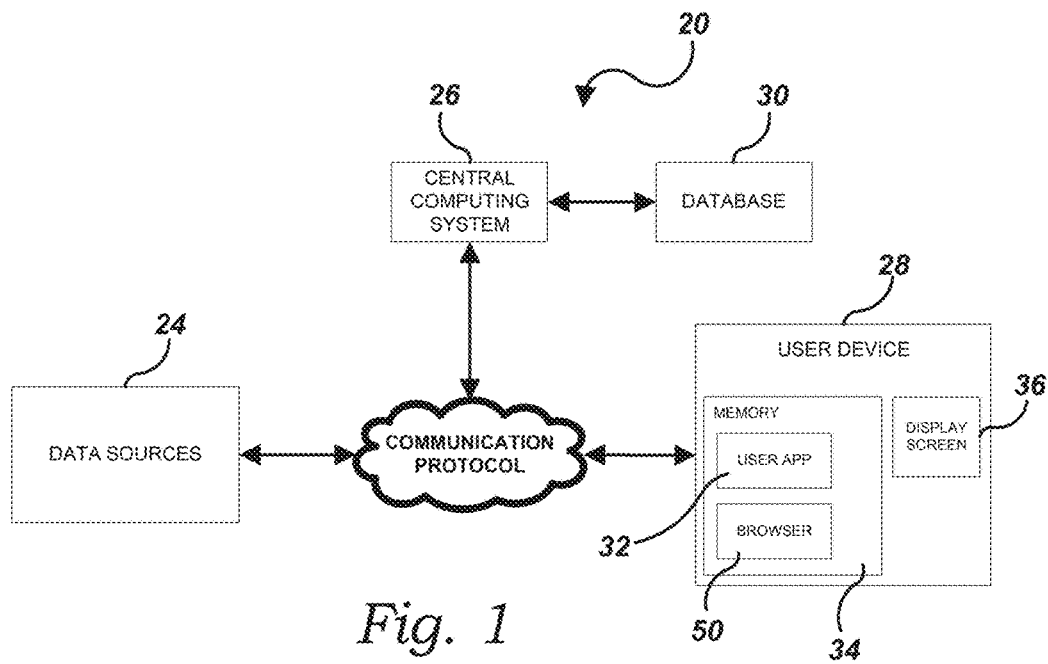
FIG. 1 is a simplified schematic view of an exemplary dynamic research system, in accordance with at least one embodiment.

Turning now to FIG. 1, there is shown a simplified schematic view of an exemplary dynamic research system 20 configured for assisting an at least one user with dynamically and automatically researching an at least one subject 22 across a plurality of data sources 24, in accordance with at least one embodiment. The system 20 provides, in at least one embodiment, a central computing system 26 configured for receiving and processing data related to the at least one user, the at least one subject 22, and the data sources 24. Additionally, in at least one embodiment, an at least one user device 28 is in selective communication with the computing system 26. In at least one embodiment, an at least one database 30 is in communication with the computing system 26 and configured for selectively storing the data related to the at least one user, the at least one subject 22, and the data sources 24. It should be noted that, in at least one embodiment, the computing system 26 and database 30 are one and the same—as such, it is intended that those terms as used herein are to be interchangeable with one another. In at least one embodiment, the computing system 26 and database 30 are omitted, such that the system 20 and associated methods described herein are implemented solely through the at least one user device 28—thus, any methods or functionality described herein as being carried out by the computing system 26 or database 30 may, in at least one embodiment, also be carried out by the at least one user device 28, regardless of whether such embodiments nevertheless incorporate the computing system 26 and/or database 30.

At the outset, it should be noted that the respective communication between each of the computing system 26, at least one user device 28, and at least one database 30 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the term "user device" is intended to include any type of computing or electronic device, now known or later developed, capable of communicating with the computing system 26 or otherwise performing electronic research, as described further below—such as desktop computers, mobile phones, smartphones, laptop computers, tablet computers, personal data assistants, gaming devices, wearable devices, etc. As such, the system 20 should not be read as being limited to use with any one particular type of computing or electronic device, even though certain exemplary devices may be mentioned or shown herein for illustrative purposes. Similarly, it should be noted that the term "data source" is intended to include any type of electronic or digital source of data or information (either local or remote relative to the at least one user device 28), now known or later developed, capable of being selectively accessed by at least one of the computing system 26 and the at least one user device 28—such as social networking websites (i.e., Facebook®, LinkedIn®, Twitter®, etc.), Internet search engines (i.e., Google®, Yahoo!®, etc.), customer relationship management ("CRM") databases (i.e., Salesforce®, etc.), current event websites (i.e., CNN, Wall Street Journal, etc.), third party websites and databases generally, etc. As such, the system 20 should not be read as being limited to use with any one particular type of data source 24, even though certain exemplary data sources 24 may be mentioned or shown herein for illustrative purposes.

With continued reference to FIG. 1, in the exemplary embodiment, each of the computing system 26, at least one user device 28, and at least one database 30 contains the hardware and software necessary to carry out the exemplary methods for administering the dynamic research system 20, as described herein. Furthermore, in at least one embodiment, the computing system 26 comprises a plurality of computing devices selectively working in concert with one another to carry out the exemplary methods for administering the dynamic research system 20, as described herein. In at least one embodiment, the at least one user device 28 provides a user application 32 residing locally in memory 34 on the user device 28, the user application 32 being configured for selectively communicating with the computing system 26 or otherwise carrying out the dynamic research methods described herein, as discussed further below. It should be noted that the term "memory" is intended to include any type of electronic storage medium (or combination of storage mediums) now known or later developed, such as local hard drives, RAM, flash memory, secure digital ("SD") cards, external storage devices, network or cloud storage devices, integrated circuits, etc. Additionally, in at least one embodiment, the at least one user device 28 is in the possession or otherwise under the control of a user who is desirous of utilizing the system 20 for performing dynamic research related to the at least one subject 22.

Additionally, the various components of the at least one user device 28 may reside on a single computing and/or electronic device, or may separately reside on two or more computing and/or electronic devices in communication with one another. In at least one embodiment, the functionality provided by the user application 32 resides remotely in memory on the computing system 26 and/or database 30, with the at least one user device 28 capable of accessing said functionality via an online portal hosted by the computing system 26 and/or database 30, either in addition to or in lieu of the user application 32 residing locally in memory 34 on the at least one user device 28. It should be noted that, for simplicity purposes, the functionality provided by the user application 32 will be described herein as such—even though certain embodiments may provide some or all of said functionality through an online portal. It should also be noted that, for simplicity purposes, when discussing functionality and the various methods that may be carried out by the system 20 herein, the terms "user device" and "user application" are intended to be interchangeable.

With continued reference to FIG. 1, in at least one embodiment, the at least one user device 28 provides an at least one display screen 36 for providing an at least one graphical user interface to assist the associated user in possession of the user device 28 to access and utilize the various functions provided by the system 20, as discussed further below.

Figure 2:
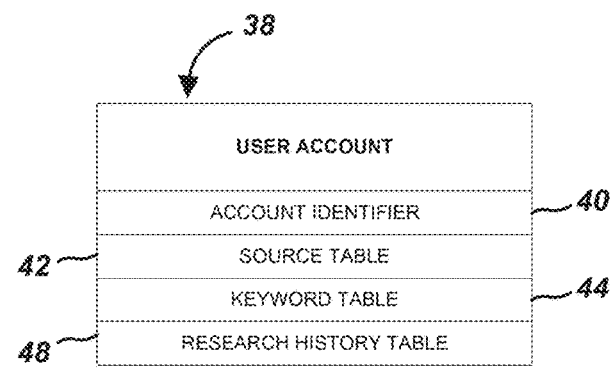
FIG. 2 is an architecture diagram of an exemplary user account, in accordance with at least one embodiment.

In at least one embodiment, as illustrated in the architecture diagram of FIG. 2, the computing system 26—or the at least one database 30—stores and manages a user account 38 for each user containing various details related to the user, the at least one subject 22, and the data sources 24. In at least one alternate embodiment, the user account 38 is stored in memory 34 on the associated at least one user device 28. In at least one embodiment, each user account 38 contains at least one of a unique account identifier 40 (such as an alphanumeric username or email address, for example), a source table 42 containing details related to at least one data source 24 to be accessed when researching the at least one subject 22 on behalf of the associated user, a keyword table 44 containing particular keywords 46 to be searched in connection with the at least one subject 22 across the at least one data source 24, and a research history table 48 containing details related to an at least one previous research task performed on behalf of the associated user. It should be noted that while the term "table" is used herein to describe certain exemplary data structures, in at least one embodiment, any other suitable data type or data structure, or combinations thereof, now known or later developed, capable of storing the appropriate data, may be substituted. Thus, the present invention should not be read as being so limited.

As mentioned above, in at least one embodiment, the system 20 assists the at least one user with dynamically and automatically researching at least one subject 22 across a plurality of data sources 24. Furthermore, given the wide range of different types of subjects that the system 20 may be configured to research, the system 20 may be utilized in a variety of contexts. As such, the system 20 and associated methods described herein should not be read as being so limited. Instead, the system 20 and associated methods described herein are provided for illustrative purposes only in order to facilitate a more complete understanding of representative embodiments now contemplated. These examples are intended to be a mere subset of all possible contexts in which the system 20 may be utilized. Ultimately, the system 20 may be utilized in virtually any context where dynamically and automatically researching at least one subject 22 is desired.

Figure 3:
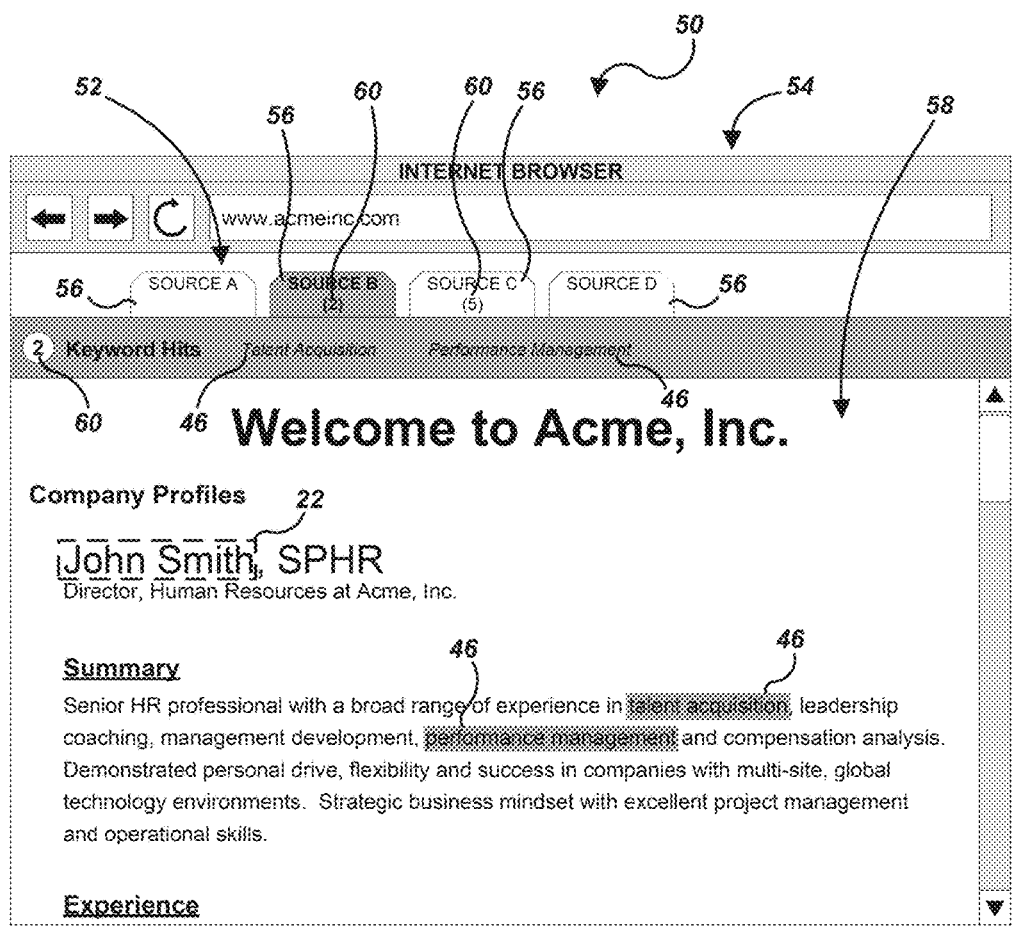
FIGS. 3 and 4 are illustrations of an exemplary user interface as displayed by an exemplary user device, in accordance with at least one embodiment.
Figure 4:
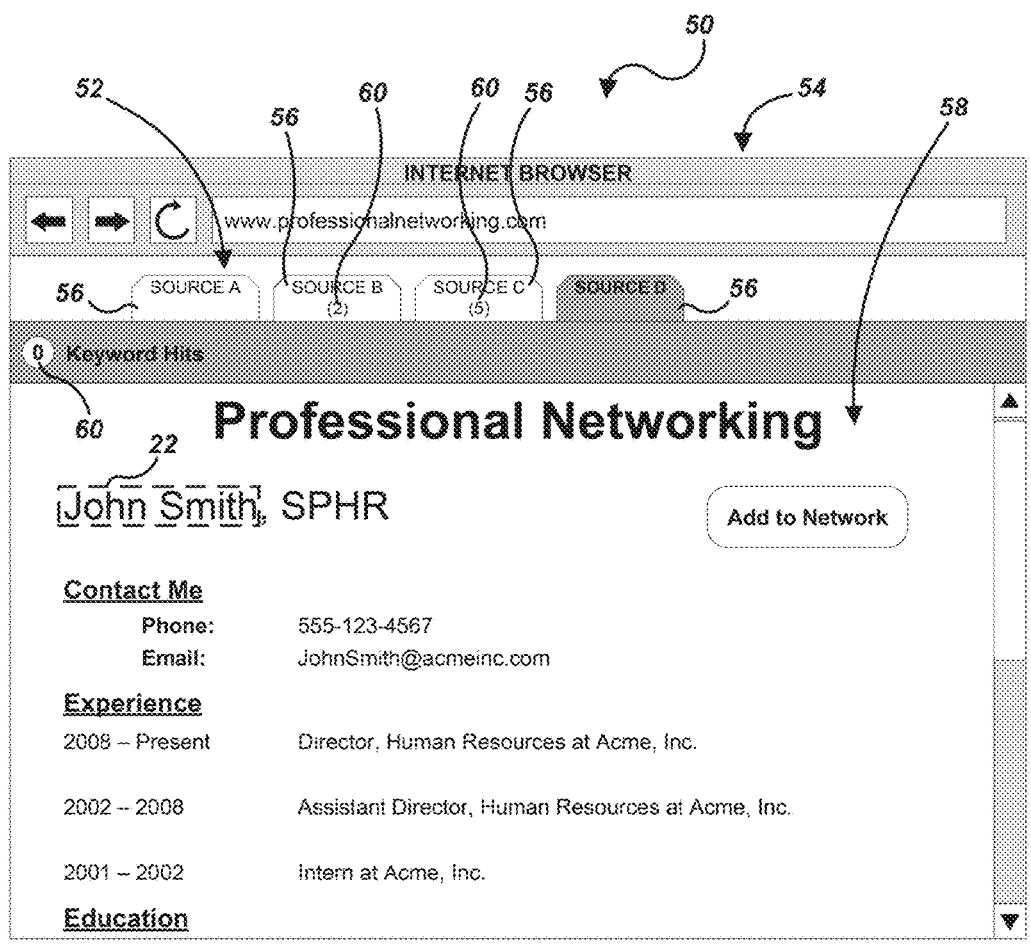

In at least one embodiment, as illustrated in FIGS. 3 and 4, the user application 32 embeds itself within—or otherwise runs in the background in memory 34 on the user device 28 and is interoperable with—an existing Internet browser application 50 on the user device 28 (or alternatively, on the computing system 26). Additionally, in at least one embodiment, the user application 32 may be configured for running in the background on further applications on the user device 28, such as word processing applications for example, thereby allowing the user to more easily research subjects 22 contained within such further applications. In at least one embodiment, the user application 32 provides a plug-in or extension configured for allowing the system 20 to operate within the browser application 50. In at least one further embodiment, rather than being embedded or otherwise operable with an existing browser application 50, the user application 32 itself provides a standalone Internet browser application. In at least one embodiment, the user application 32 generates a dynamic navigation display 52 configured for being overlaid on an existing user interface 54 provided by the browser application 50 (as displayed on display screen 36 of the user device 28). In at least one such embodiment, the navigation display 52 is positioned above the content displayed by the user interface 54 of the browser application 50 (FIGS. 3 and 4); however, in further embodiments (not shown), the navigation display 52 may be positioned elsewhere, such as along a left or right side, or a top or bottom edge, of the user interface 54 of the browser application 50, for example. In at least one embodiment, as discussed further below, the navigation display 52 provides a plurality of graphical elements 56—such as tabs (FIGS. 3 and 4), buttons or icons, for example—with each graphical element 56 representing a different data source 24 (or a different page 58 of a data source 24) containing information on the at least one subject 22 being researched. In further embodiments, the navigation display 52 and each of the graphical elements 56 may take on any other graphical configuration or arrangement, now known or later developed, so long as the system 20 is substantially capable of carrying out the functionality described herein. As such, the present invention should not be read as being limited to only the tab design depicted in the accompanying drawings, as such a design is shown for illustrative purposes only. Additionally, in at least one embodiment, as discussed further below, each such graphical element 56 is linked to the relevant data (i.e., the data related to the at least one subject 22 being researched) provided by the associated data source 24, thus allowing the user to selectively visit (i.e., view) the relevant page(s) 58 hosted by a given data source 24 by "clicking on" or otherwise selecting the appropriate graphical element 56 of the navigation display 52. In at least one such embodiment, where the user application 32 is configured as a plug-in or extension, the navigation display 52 is overlaid on the existing user interface 54 of the browser application 50 by injecting an at least one code snippet into the page displayed by the browser application 50 after the page has been requested by the browser application 50—i.e., immediately before, concurrently with, and/or immediately after the page loads. In at least one embodiment, the at least one code snippet is a combination of HTML, CSS and/or JavaScript; however, in further embodiments, the at least one code snippet may comprise any other programming language (or combination of languages), now known or later developed, so long as the system 20 is substantially capable of carrying out the functionality described herein. Upon a given graphical element 56 being clicked by the user, the relevant page 58 of the associated data source 24 is loaded in the browser application 50, with the HTML snippet being injected once again after the page 58 has loaded; thereby simulating the experience of a persistent navigation display 52 across multiple pages 58 (and potentially multiple domains), though all within a single instance of the browser application 50.

Figure 5:
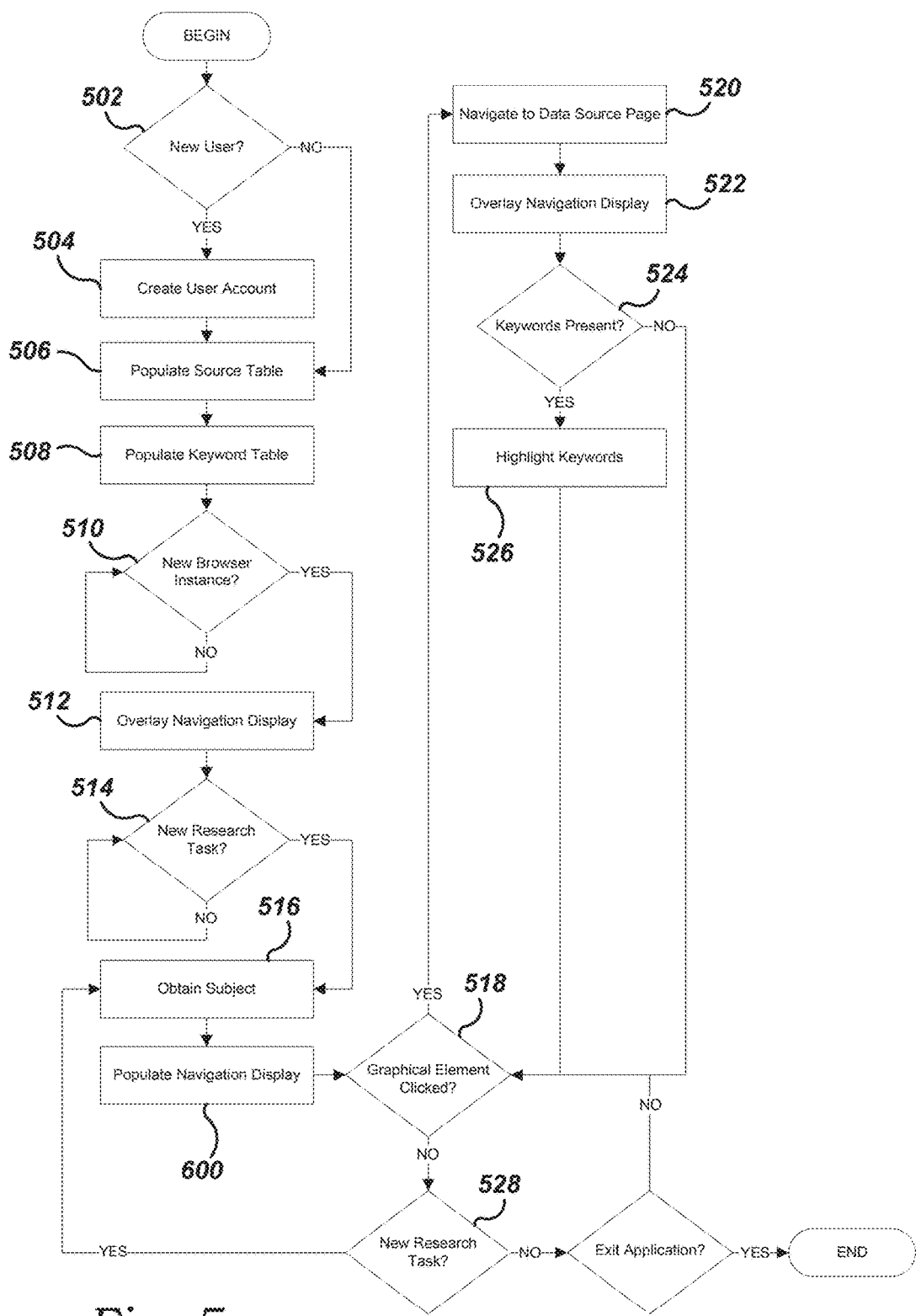

In at least one embodiment, as illustrated in the flow diagram of FIG. 5, through the user application 32 residing either locally in memory 34 on the at least one user device 28 or remotely on the computing system 26 and/or database 30, upon the associated user desiring to utilize the system 20 for performing dynamic research related to at least one subject 22, the computing system 22 first determines whether the associated user is new to the system 20 (502). In at least one embodiment, if the associated user is new, the user is required to properly register a new user account 38 with the computing system 26 via the user device 28 (504)—or, alternatively, via any other computing or electronic device capable of communicating with at least one of the user application 32 and the computing system 26. In at least one embodiment, the user is provided with the opportunity to specify particular data sources 24 to be utilized by the system 20 in researching the at least one subject 22, with a list of said data sources 24 being stored in the source table 42 of the associated user account 38 (506). In at least one further embodiment, the source table 42 is automatically and dynamically populated by the user application 32 based on the particular type of subject 22 to be researched. Similarly, in at least one embodiment, the user is provided with the opportunity to specify particular keywords 46 to be searched in connection with the at least one subject 22 across the at least one data source 24, with a list of said keywords 46 being stored in the keyword table 44 of the associated user account 38 (508). For example, as illustrated in FIGS. 3 and 4, where the subject 22 is a person and the user is interested in knowing whether the subject 22 has experience with talent acquisition or performance management, the user may include the keywords 46 "talent acquisition" and "performance management" in the keyword table 44, the purpose of which is discussed further below. In at least one further embodiment, the keyword table 44 is automatically and dynamically populated by the user application 32 based on the particular type of subject 22 to be researched.

In at least one embodiment, upon a new instance of the browser application 50 being opened (510), the navigation display 52 is automatically overlaid onto the user interface 54 of the browser application 50 (512). The user application 32 then waits until the user executes a new research task (514), at which point the desired subject 22 to be researched is obtained (516). In at least one embodiment, the user manually executes a new research task by specifying the subject 22 to be researched—such as by manually inputting the subject 22 by keyboard or other input device, or by highlighting the subject 22 within content displayed by the browser application 50 (or by further application that is in communication with the user application 32, as discussed above), for example. In at least one further embodiment, the user application 32 is configured for automatically identifying and obtaining the subject 22 to be researched—for example, automatically identifying any person's or company's name that might appear on a given page 58 as displayed by the browser application 50.

As shown in FIG. 6, and as further illustrated in FIGS. 3 and 4, in at least one embodiment, after obtaining the desired subject 22 to be researched (516), the user application 32 populates the navigation display 52 (600) by first performing a search of a first one of the at least one data source 24 in the source table 42 of the associated user account 38 (602) to determine whether the data source 24 contains any data related to the subject 22 (604). Upon determining that the data source 24 contains data related to the subject 22, a graphical element 56 associated with the data source 24 is generated and displayed within the navigation display 52 (606), providing the user with the ability to selectively navigate within the browser application 50 to the appropriate page 58 of the data source 24 to view the data related to the subject 22. In this way, if a given data source 24 contains no data related to the subject 22, no graphical element 56 associated with the data source 24 will be generated; thus, in such an embodiment, the navigation display 52 will only be populated with data sources 24 that actually contain data related to the subject 22. Additionally, in at least one embodiment, the user application 32 performs a search of the appropriate page 58 of the data source 24 to determine whether any of the keywords 46 contained in the keyword table 44 of the associated user account 38 are present within the content of the page 58 of the data source 24 (608). In at least one embodiment, the graphical element 56 associated with the data source 24 provides a keyword count 60 representing the number of keywords 46 present on the appropriate page 58 of the associated data source 24, thereby providing the user with a quick visual indicator as to the potential relevance or usefulness of the associated data source 24 with respect to the subject 22. The user application 32 moves to the next data source 24 (if any) in the source table 42 (612) and repeats these same steps until each of the at least one data source 24 has been checked relative to the subject 22 (610).

Referring again to FIG. 5, in at least one embodiment, upon the user clicking one of the graphical elements 56 (518), the user application 32 causes the browser application 50 to navigate to the appropriate page 58 of the data source 24 associated with the graphical element 56 (520), with the navigation display 52 being automatically overlaid onto the user interface 54 of the browser application 50 once again (522). Additionally, in at least one embodiment, as illustrated in FIG. 3, upon determining that the page 58 of the data source 24 contains one or more keywords 46 contained in the keyword table 44 of the associated user account 38 (524), the identified keywords 46 are highlighted (or otherwise visually notated) by the user application 32 (526). Upon the user executing a new research task, based on a new subject 22 (528), the above steps are repeated accordingly with the navigation display 52 being dynamically updated.

One exemplary context in which the system 20 may be utilized is sales and marketing, where a typical sales representative may traditionally spend twenty to thirty minutes or more preparing for a phone call or meeting by researching the person or persons with whom the representative will be speaking. In at least one embodiment, the system 20 is able to significantly reduce the amount of research time for the representative by dynamically and automatically researching the person or persons with whom the representative will be speaking across a plurality of data sources 24, such as Salesforce®, Facebook®, LinkedIn®, Twitter®, Google®, and the person's company website, for example. As a further example, where the sales representative is desirous of placing a cold call (i.e., soliciting business from a potential customer who has had no prior contact with the sales representative conducting the call) to the CEO of a target company, the system 20 may use the target company as the subject 22 in order to automatically research and determine the name of the CEO, then subsequently research the CEO across a plurality of data sources 24. Furthermore, in at least one embodiment, the system 20 presents the findings in an organized, user-friendly format, allowing the representative to selectively navigate between data sources 24 seamlessly.

Again, these non-limiting examples are provided for illustrative purposes only in order to facilitate a more complete understanding of representative embodiments now contemplated. These examples are intended to be a mere subset of all possible contexts in which the system 20 may be utilized. Ultimately, the system 20 may be utilized in virtually any context where dynamically and automatically researching at least one subject 22 is desired.

Aspects of the present specification may also be described as follows:

1. A method for administering a dynamic research system for assisting an at least one user with dynamically and automatically researching an at least one subject across a plurality of data sources, the method comprising the steps of: implementing a user application residing in memory on an at least one user device under the control of the at least one user, the user application configured for operating at least partially within an Internet browser application also residing in memory on the at least one user device; establishing a user account associated with a one of the at least one user, the user account containing at least one of a source table containing details related to at least one data source to be accessed when researching the at least one subject on behalf of the associated user, and a keyword table containing particular keywords to be searched in connection with the at least one subject across the at least one data source; and upon a new instance of the browser application being opened on the user device: overlaying a navigation display onto a user interface of the browser application; and upon the associated user executing a new research task: obtaining the at least one subject to be researched; for each of the at least one data source contained in the source table: upon determining that an at least one page of said data source contains data related to the at least one subject: generating a graphical element associated with said at least one page of said data source; and displaying the graphical element in the navigation display; and upon the user selecting a one of the at least one graphical element in the navigation display: navigating, via the browser application, to the at least one page of the data source associated with the selected graphical element; and overlaying the navigation display onto the user interface of the browser application, thereby simulating a persistent navigation display across multiple pages, though all within a single instance of the browser application.

2. The method according to embodiment 1, further comprising the step of implementing a central computing system in selective communication with the at least one user device and configured for receiving and processing data related to the at least one user, the at least one subject, and the data sources.

3. The method according to embodiments 1-2, further comprising the step of implementing an at least one database in communication with the computing system and configured for selectively storing said data related to the at least one user, the at least one subject, and the data sources.

4. The method according to embodiments 1-3, further comprising the step of populating the source table with at least one data source to be accessed when researching the at least one subject.

5. The method according to embodiments 1-4, further comprising the step of populating the keyword table with at least one keyword to be searched in connection with the at least one subject across the at least one data source.

6. The method according to embodiments 1-5, wherein the step of overlaying the navigation display onto the user interface of the browser application further comprises the step of injecting an at least one code snippet into the page displayed by the browser application after said page has been requested by the browser application.

7. The method according to embodiments 1-6, wherein the step of overlaying the navigation display onto the user interface of the browser application further comprises the step of positioning the navigation display above the at least one page being displayed by the browser application.

8. The method according to embodiments 1-7, wherein the step of generating a graphical element associated with said at least one page of said data source, further comprises the step of generating a graphical tab associated with said at least one page of said data source.

9. The method according to embodiments 1-8, wherein the step of determining that at least one page of said data source contains data related to the at least one subject, further comprises the step of determining whether any of the at least one keyword contained in the keyword table of the associated user account is present within said at least one page of said data source.

10. The method according to embodiments 1-9, further comprising the step of displaying a keyword count associated with each of the at least one graphical element in the navigation display, each keyword count representing the number of keywords present on the at least one page of the data source associated with the corresponding graphical element.

11. The method according to embodiments 1-10, further comprising the step of, upon determining that the at least one page of the data source associated with the selected graphical element contains at least one keyword contained in the keyword table of the associated user account, visually notating the at least one keyword on said at least one page.

12. The method according to embodiments 1-11, wherein the step of visually notating the at least one keyword on said at least one page, further comprises the step of highlighting the at least one keyword on said at least one page.

13. A method for administering a dynamic research system for assisting an at least one user with dynamically and automatically researching an at least one subject across a plurality of data sources, the method comprising the steps of: implementing a user application residing in memory on an at least one user device under the control of the at least one user, the user application configured for operating at least partially within an Internet browser application also residing in memory on the at least one user device; establishing a user account associated with a one of the at least one user, the user account containing at least one of a source table containing details related to at least one data source to be accessed when researching the at least one subject on behalf of the associated user, and a keyword table containing particular keywords to be searched in connection with the at least one subject across the at least one data source; and upon a new instance of the browser application being opened on the user device: overlaying a navigation display onto a user interface of the browser application; and upon the associated user executing a new research task: obtaining the at least one subject to be researched; for each of the at least one data source contained in the source table: upon determining that an at least one page of said data source contains data related to the at least one subject: generating a graphical element associated with said at least one page of said data source; and displaying the graphical element in the navigation display; and upon the user selecting a one of the at least one graphical element in the navigation display: navigating, via the browser application, to the at least one page of the data source associated with the selected graphical element; overlaying the navigation display onto the user interface of the browser application, thereby simulating a persistent navigation display across multiple pages, though all within a single instance of the browser application; and upon determining that the at least one page of the data source associated with the selected graphical element contains at least one keyword contained in the keyword table of the associated user account, visually notating the at least one keyword on said at least one page.

14. A dynamic research system for assisting an at least one user with dynamically and automatically researching an at least one subject across a plurality of data sources, the system comprising: a user device under the control of the at least one user; a user application residing in memory on the at least one user device and configured for operating at least partially within an Internet browser application also residing in memory on the at least one user device; and a user account associated with a one of the at least one user, the user account containing at least one of a source table containing details related to at least one data source to be accessed when researching the at least one subject on behalf of the associated user, and a keyword table containing particular keywords to be searched in connection with the at least one subject across the at least one data source; wherein, upon a new instance of the browser application being opened on the user device, the system is configured for: overlaying a navigation display onto a user interface of the browser application; and upon the associated user executing a new research task: obtaining the at least one subject to be researched; for each of the at least one data source contained in the source table: upon determining that an at least one page of said data source contains data related to the at least one subject: generating a graphical element associated with said at least one page of said data source; and displaying the graphical element in the navigation display; and upon the user selecting a one of the at least one graphical element in the navigation display: navigating, via the browser application, to the at least one page of the data source associated with the selected graphical element; and overlaying the navigation display onto the user interface of the browser application, thereby simulating a persistent navigation display across multiple pages, though all within a single instance of the browser application.

15. The dynamic research system according to embodiment 14, wherein the user application provides a plug-in or extension configured for allowing the system to operate within the browser application.

16. The dynamic research system according to embodiments 14-15, further comprising a central computing system in selective communication with the at least one user device and configured for receiving and processing data related to the at least one user, the at least one subject, and the data sources.

17. The dynamic research system according to embodiments 14-16, further comprising an at least one database in communication with the computing system and configured for selectively storing said data related to the at least one user, the at least one subject, and the data sources.

18. The dynamic research system according to embodiments 14-17, wherein the system is further configured for populating the source table with at least one data source to be accessed when researching the at least one subject.

19. The dynamic research system according to embodiments 14-18, wherein the system is further configured for populating the keyword table with at least one keyword to be searched in connection with the at least one subject across the at least one data source.

20. The dynamic research system according to embodiments 14-19, wherein the while overlaying the navigation display onto the user interface of the browser application, the system is further configured for injecting an at least one code snippet into the page displayed by the browser application after said page has been requested by the browser application.

21. The dynamic research system according to embodiments 14-20, wherein while overlaying the navigation display onto the user interface of the browser application, the system is further configured for positioning the navigation display above the at least one page being displayed by the browser application.

22. The dynamic research system according to embodiments 14-21, wherein the graphical element associated with said at least one page of said data source is a graphical tab.

23. The dynamic research system according to embodiments 14-22, wherein while determining that at least one page of said data source contains data related to the at least one subject, the system is further configured for determining whether any of the at least one keyword contained in the keyword table of the associated user account is present within said at least one page of said data source.

24. The dynamic research system according to embodiments 14-23, wherein the system is further configured for displaying a keyword count associated with each of the at least one graphical element in the navigation display, each keyword count representing the number of keywords present on the at least one page of the data source associated with the corresponding graphical element.

25. The dynamic research system according to embodiments 14-24, wherein upon determining that the at least one page of the data source associated with the selected graphical element contains at least one keyword contained in the keyword table of the associated user account, the system is further configured for visually notating the at least one keyword on said at least one page.

26. The dynamic research system according to embodiments 14-25, wherein while visually notating the at least one keyword on said at least one page, the system is further configured for highlighting the at least one keyword on said at least one page.

In closing, regarding the exemplary embodiments of the present invention as shown and described herein, it will be appreciated that a dynamic research system and associated methods are disclosed for assisting at least one user with dynamically and automatically researching at least one subject across a plurality of data sources. Because the principles of the invention may be practiced in a number of configurations beyond those shown and described, it is to be understood that the invention is not in any way limited by the exemplary embodiments, but is generally directed to a dynamic research system and is able to take numerous forms to do so without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for administering a dynamic research system for assisting an at least one user with dynamically and automatically researching an at least one subject across a plurality of third party data sources, the method comprising the steps of:

implementing a user application residing in memory on an at least one user device under the control of the at least one user, the user application configured for operating at least partially within an Internet browser application also residing in memory on the at least one user device;

establishing a user account associated with a one of the at least one user, the user account containing at least one of a source table containing details related to a plurality of third party data sources to be accessed when researching the at least one subject on behalf of the associated user, and a keyword table containing particular keywords to be searched in connection with the at least one subject across the data sources; and upon a new instance of the browser application being opened on the user device:

overlaying a navigation display onto a user interface of the browser application; and upon the associated user executing a new research task:
obtaining the at least one subject to be researched;
for each of the data sources contained in the source table:
upon determining that an at least one page of said data source contains data related to the at least one subject:
generating a graphical element associated with said at least one page of said data source; and
displaying the graphical element in the navigation display; and
upon the user selecting a one of the at least one graphical element in the navigation display:
navigating, via the browser application, to the at least one page of the data source associated with the selected graphical element; and
overlaying the navigation display onto the user interface of the browser application, thereby simulating a persistent navigation display across multiple third party data source pages, though all within a single instance of the browser application.

2. The method of claim 1, further comprising the step of implementing a central computing system in selective communication with the at least one user device and configured for receiving and processing data related to the at least one user, the at least one subject, and the data sources.

3. The method of claim 2, further comprising the step of implementing an at least one database in communication with the computing system and configured for selectively storing said data related to the at least one user, the at least one subject, and the data sources.

4. The method of claim 1, further comprising the step of populating the source table with the data sources to be accessed when researching the at least one subject.

5. The method of claim 1, further comprising the step of populating the keyword table with at least one keyword to be searched in connection with the at least one subject across the data sources.

6. The method of claim 1, wherein the step of overlaying the navigation display onto the user interface of the browser application further comprises the step of injecting an at least one code snippet into the page displayed by the browser application after said page has been requested by the browser application.

7. The method of claim 1, wherein the step of generating a graphical element associated with said at least one page of said data source, further comprises the step of generating a graphical tab associated with said at least one page of said data source.

8. The method of claim 1, wherein the step of determining that at least one page of said data source contains data related to the at least one subject, further comprises the step of determining whether any of the at least one keyword contained in the keyword table of the associated user account is present within said at least one page of said data source.

9. The method of claim 8, further comprising the step of displaying a keyword count associated with each of the at least one graphical element in the navigation display, each keyword count representing the number of keywords present on the at least one page of the data source associated with the corresponding graphical element.

10. The method of claim 8, further comprising the step of, upon determining that the at least one page of the data source associated with the selected graphical element contains at least one keyword contained in the keyword table of the associated user account, visually notating the at least one keyword on said at least one page.

11. The method of claim 10, wherein the step of visually notating the at least one keyword on said at least one page, further comprises the step of highlighting the at least one keyword on said at least one page.

12. A method for administering a dynamic research system for assisting an at least one user with dynamically and automatically researching an at least one subject across a plurality of third party data sources, the method comprising the steps of:
implementing a user application residing in memory on an at least one user device under the control of the at least one user, the user application configured for operating at least partially within an Internet browser application also residing in memory on the at least one user device;
establishing a user account associated with a one of the at least one user, the user account containing at least one of a source table containing details related to a plurality of third party data sources to be accessed when researching the at least one subject on behalf of the associated user, and a keyword table containing particular keywords to be searched in connection with the at least one subject across the data sources; and
upon a new instance of the browser application being opened on the user device:
overlaying a navigation display onto a user interface of the browser application; and
upon the associated user executing a new research task:
obtaining the at least one subject to be researched;
for each of the data sources contained in the source table:
upon determining that an at least one page of said data source contains data related to the at least one subject:
generating a graphical element associated with said at least one page of said data source; and
displaying the graphical element in the navigation display; and
upon the user selecting a one of the at least one graphical element in the navigation display:
navigating, via the browser application, to the at least one page of the data source associated with the selected graphical element;
overlaying the navigation display onto the user interface of the browser application, thereby simulating a persistent navigation display across multiple third party data source pages, though all within a single instance of the browser application; and
upon determining that the at least one page of the data source associated with the selected graphical element contains at least one keyword contained in the keyword table of the associated user account, visually notating the at least one keyword on said at least one page.

13. A dynamic research system for assisting an at least one user with dynamically and automatically researching an at least one subject across a plurality of third party data sources, the system comprising:
a user device under the control of the at least one user;
a user application residing in memory on the at least one user device and configured for operating at least partially within an Internet browser application also residing in memory on the at least one user device; and
a user account associated with a one of the at least one user, the user account containing at least one of a source table containing details related to a plurality of third party data sources to be accessed when researching the at least one subject on behalf of the associated user, and a keyword table containing particular keywords to be searched in connection with the at least one subject across the data sources;

wherein, upon a new instance of the browser application being opened on the user device, the system is configured for:
  overlaying a navigation display onto a user interface of the browser application; and
  upon the associated user executing a new research task:
    obtaining the at least one subject to be researched;
    for each of the data sources contained in the source table:
      upon determining that an at least one page of said data source contains data related to the at least one subject:
        generating a graphical element associated with said at least one page of said data source; and
        displaying the graphical element in the navigation display; and
      upon the user selecting a one of the at least one graphical element in the navigation display:
        navigating, via the browser application, to the at least one page of the data source associated with the selected graphical element; and
        overlaying the navigation display onto the user interface of the browser application, thereby simulating a persistent navigation display across multiple third party data source pages, though all within a single instance of the browser application.

14. The dynamic research system of claim 13, wherein the user application provides a plug-in or extension configured for allowing the system to operate within the browser application.

15. The dynamic research system of claim 13, further comprising a central computing system in selective communication with the at least one user device and configured for receiving and processing data related to the at least one user, the at least one subject, and the data sources.

16. The dynamic research system of claim 15, further comprising an at least one database in communication with the computing system and configured for selectively storing said data related to the at least one user, the at least one subject, and the data sources.

17. The dynamic research system of claim 13, wherein the graphical element associated with said at least one page of said data source is a graphical tab.

18. The dynamic research system of claim 13, wherein while determining that at least one page of said data source contains data related to the at least one subject, the system is further configured for determining whether any of the at least one keyword contained in the keyword table of the associated user account is present within said at least one page of said data source.

19. The dynamic research system of claim 13, wherein the system is further configured for displaying a keyword count associated with each of the at least one graphical element in the navigation display, each keyword count representing the number of keywords present on the at least one page of the data source associated with the corresponding graphical element.

20. The dynamic research system of claim 19, wherein upon determining that the at least one page of the data source associated with the selected graphical element contains at least one keyword contained in the keyword table of the associated user account, the system is further configured for visually notating the at least one keyword on said at least one page.

* * * * *